April 22, 1952   W. T. WALKER   2,593,635
METHOD AND MECHANISM FOR RAISING VEHICLES
Filed July 24, 1946   6 Sheets-Sheet 3

INVENTOR.
Willard T. Walker
BY
Harness, Dickey & Pierce.
ATTORNEYS

April 22, 1952 — W. T. WALKER — 2,593,635
METHOD AND MECHANISM FOR RAISING VEHICLES
Filed July 24, 1946 — 6 Sheets-Sheet 5

Patented Apr. 22, 1952

2,593,635

UNITED STATES PATENT OFFICE 2,593,635

METHOD AND MECHANISM FOR RAISING VEHICLES

Willard T. Walker, Racine, Wis., assignor, by mesne assignments, to Globe Hoist Company, Des Moines, Iowa, a corporation of Iowa Application July 24, 1946, Serial No. 685,816

5 Claims. (Cl. 254—92)

1

The present invention relates to lifting devices, and is particularly concerned with improvements in lifts designed for elevating motor vehicles to permit convenient access to the underbody of the vehicle for the performance of servicing operations and the like.

An important object of the invention is to provide an improved lift structure so designed that the lifting mechanism does not interfere with free access to those underportions of the vehicle which require servicing, despite the fact that the vehicle is lifted from beneath, by load-supporting parts which are adapted to engage the frame or axles of the vehicle, the load-supporting parts being of relatively small size and arranged in a novel manner such that they present no interference with accessibility of all portions of the underside of the vehicle.

An object related to that last stated is to provide an improved lift including a pair of laterally spaced lifting structures located upon either side of and substantially midway of the length of the generally rectangular area into which the vehicle to be lifted is moved or driven, the lifting structures being upright and so located as to lie upon either side of and in approximate alignment with the center of gravity of the vehicle when the latter is in position to be lifted.

Another object of the present invention is to provide improved lift mechanisms having the advantages indicated and adapted to be installed either with the lifting mechanism housed in columns projecting upwardly from a floor, or buried in the ground below the floor level in such fashion as to be inconspicuous and out of the way when the lifting means is lowered.

Another object is to provide an improved lift structure of the indicated character having improved means for quickly and easily adjusting its vehicle supporting portions to accommodate vehicles of widely variant dimensions.

Still another object is to provide such a lift structure provided with means engageable with either the frame or the axles or equivalent parts of a vehicle to be lifted, or to support the vehicle directly upon its wheels, as may be found desirable in accordance with the construction of the vehicle and the nature of the operation to be performed, no substitution of different mechanical parts being required and the vehicle engaging portions being individually adjustable vertically and in all directions to permit accommodation of their positioning to the most suitable frame or axle portions with which engagement may be made for lifting the vehicle.

2

Still another object is to provide such an improved lift construction incorporating mechanical lifting means located upon one side of the vehicle and mechanical cross connecting means for powering the lifting mechanism upon the opposite side of the vehicle, the cross connecting means being completely out of the way and offering no interference with access to the portions of the vehicle to be serviced.

Still another object is to provide an improved hydraulic lifting structure incorporating novel synchronizing means for correlating the action of a pair of hydraulic lifting mechanisms located upon opposite sides of the vehicle.

A further object is to provide an improved lift structure having the features above noted and including a pair of lifting structures located upon opposite sides of the vehicle space, one of such structures including hydraulically actuable lifting means and the other including a mechanical lifting mechanism driven by the hydraulically actuable lifting mechanism.

Another object of the invention is to provide an improved method for raising vehicles.

Other objects and advantages will be apparent upon consideration of the present disclosure in its entirety.

Figure 1:
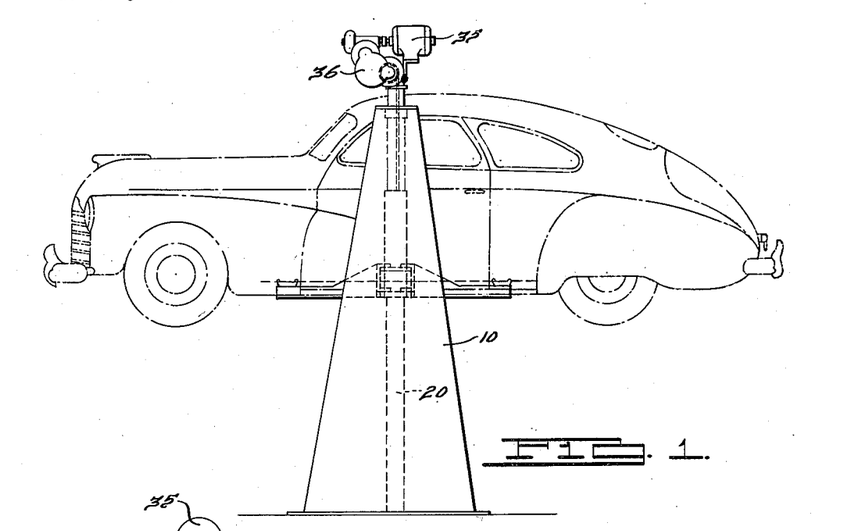
Fig. 1 is a side-elevational view of a lift structure incorporating the principles of the present invention, a vehicle in elevated position being diagrammatically indicated.
Figure 2:
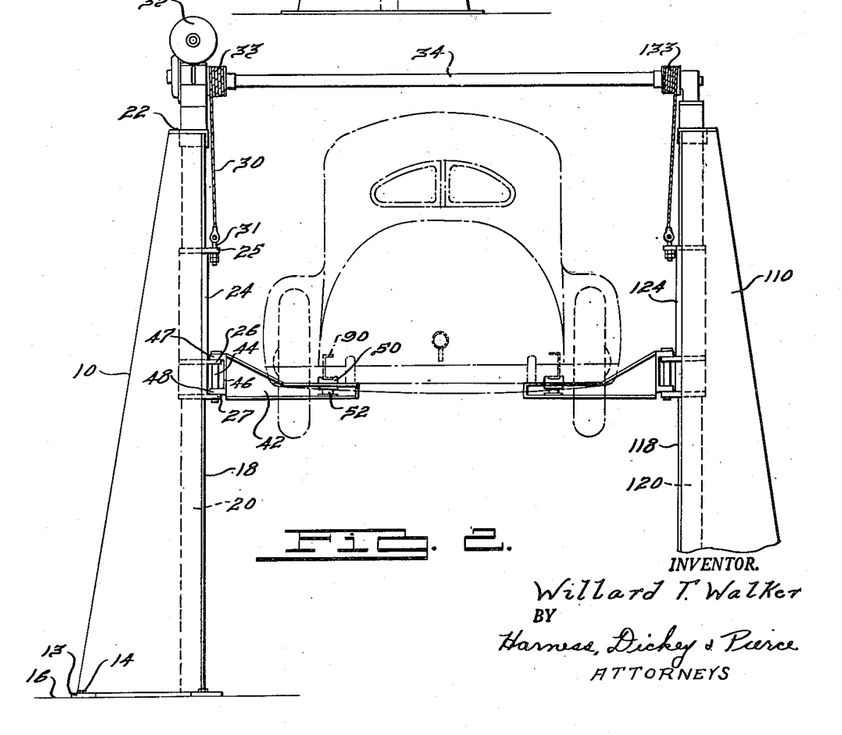
Fig. 2 is a rear elevational view of the structure, partly broken away.
Figure 3:
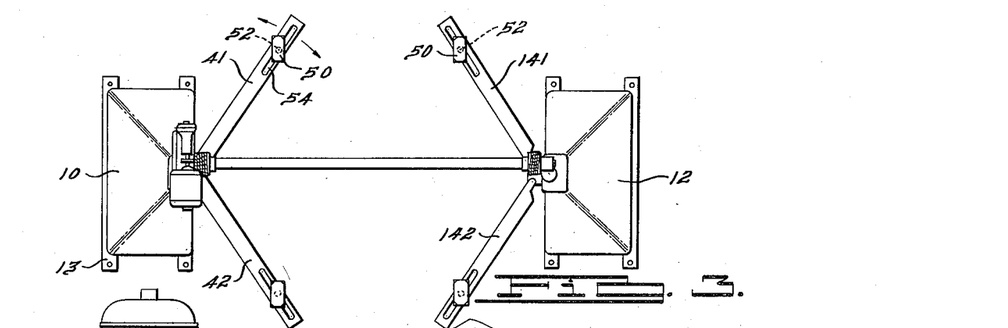
Fig. 3 is a plan view of the same.

Referring now to the drawings, reference character 10 designates a hollow metal supporting column, which may be designated the left-hand supporting column, since it lies on the left side of the generally rectangular area into which the vehicle to be lifted is moved or driven (referring to the sides of the vehicle as commonly designated). A similar supporting column 110 is arranged upon the right side of the lift area. The spacing of the columns is sufficient to permit the widest vehicle for which the lift is designed to be driven therebetween to a position in which its center of gravtiy is positioned approximately in the transverse plane of the columns.

In most respects the two columns and the mechanisms carried thereby are alike, so that description of one will suffice. The respects in which they differ will be pointed out, and parts of the right-hand assembly analogous to those of the left will be designated by corresponding reference numerals one hundred integers higher. The description will in other respects be confined to the left-hand assembly.

Each column may be formed of relatively heavy sheet or plate metal, welded or otherwise rigidly assembled and tapering to diminishing cross section toward its top. Its base is provided with securing flange portions 13 adapted to be attached to the floor 16 as by means of expansion bolts 14. The columns are of rectangular cross-section, and the inner faces 18, 118 thereof are vertical and lie parallel to the longitudinal center plane of the lift area.

Housed within the box-like enclosure of the column 10 is an upright cylindrical post or stanchion 20 which is vertical and located close and parallel to a vertical central slot formed in the inner wall 18 and extending the full distance of vertical travel of the lift. The post 20 is secured near its top and bottom to the column structure and serves to reinforce the same, it also constitutes a support for the hoisting means and serves as a guide for the lifting slide 24 which is of tubular form and slides thereupon. A horizontal plate-like structural member 22 is interposed between the stanchion 20 and the column and welded to both, forming a top for the rectangular column portion. The stanchion or post 20 projects upwardly from plate 22 to carry the hoist means and the motor 35, to which parts further reference will be made.

The vertical slot in the inner wall 18 of the standard is in alignment with the post 20, as indicated, and the lift slide 24 is substantially enclosed within the column, arranged to travel up and down upon the post and provided with lug portions 25, 26, 27, projecting through the aforementioned slot, all of such lug portions being rigidly attached to the slide 24. Lug portion 25 serves as an anchorage for the lifting cable 30, the lower end of which is connected thereto as by means of the clevis pin 31. At its upper end the cable is wrapped about the host drum 33 which is drivable by suitable power means such as the electric motor 35. The motor actuates the drum through suitable reduction gearing (not shown) housed within the gear casing 36. It will be appreciated that the details of construction and arrangement of the gearing form no part of my present invention and will require no detailed description to persons skilled in the art. The entire hoist assembly including the motor, gear casing and supporting means for the hoisting drum are carried by the upper portion of the post 20 which projects above the column for this purpose.

The lug portions 26, 27 serve as supporting brackets for the load-carrying arms 41-42, two of which are provided, these being in the form of tapering channels, thicker in vertical dimension toward their inner ends, the inner end of each such supporting arm being pivotally connected to the lift slide by the bracket lugs 26, 27, for swinging movement about vertical axes, as by means of pivot pins 44 extending through the bracket portions 26, 27 and through co-operating lugs as 47, 48 carried by fittings as 46 rigidly attached to the inner extremities of each of the supporting arms.

As previously indicated, the construction of the right-hand standard, with its enclosed stanchion or post assembly, lift slide and equivalent parts corresponds generally to that of the left-hand post structure. The hoisting drum 133 for the right-hand lift slide 124 is carried and drivable by a cross shaft 34 which is connected to and turns with the drum 33, so that the two drums are turned in absolute synchronism. The extreme right end of the shaft 34 is journaled in the top of the right-hand post 120.

The arrangement and length of the load-carrying arms 41, 42, 141, 142 are such that they may be swung back out of the way to permit a car to be driven between them, the outer ends of the opposed front arms 41, 141 and of the opposed rear arms 42, 142 being then farther apart than the width of the vehicle, while after the vehicle is positioned between the post structures the arms may be swung inwardly to angular positions in which they project beneath the vehicle so that the pads as 50 carried by their extremities may be positioned beneath the frame, axle or other portions of the vehicle to be used as points of support. To facilitate alignment of the pads 50 with the frame as 90, or other load sustaining portion, each pad may be carried by a vertical pin portion 52 slidable longitudinally of its arm as in a slot 54.

Figures 4, 5:
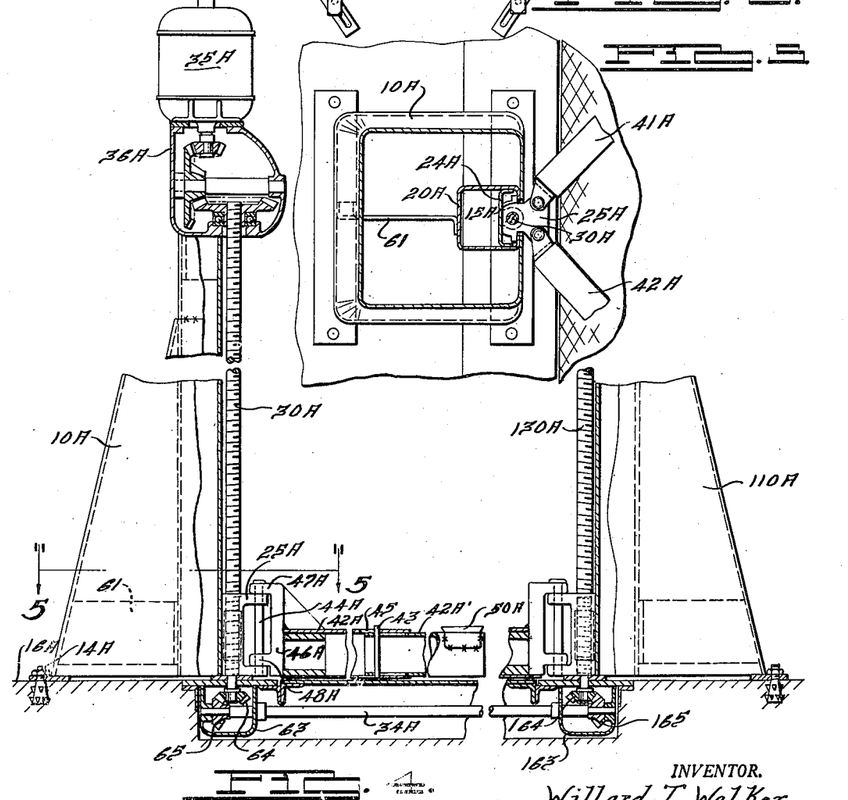
Fig. 4 is a vertical transverse sectional elevational view, partly broken away, showing a modified construction.
Fig. 5 is a cross-sectional view taken substantially on the line 5—5 of Fig. 4 and looking in the direction of the arrows.

In the modified construction shown in Figs. 4 and 5, parts analogous to those already described in connection with the first embodiment are designated by like reference characters distinguished by the addition of the letter A to each. The lift slide 24A used in this embodiment is slidably fitted into the stanchion or post 20A, which is of rectangular cross section, mounted within the column 10A and provided with a slot (undesignated) registering with the central vertical slot 15A in the inner face of the column. A vertical reinforcing web 61 may be provided connecting the rear face of the stanchion 20A with the inner face of the column 10A, serving to stiffen the assembly. The lift slide includes a traveler nut portion 25A threadedly fitted upon the vertically disposed lift screw 30A.

The traveler nut portion similarly supports the load-carrying arms. Each arm consists of two telescopic tubular sections as 42A, 42A' connected by a cross pin 43 and slot 45 permitting the outer section 42A' to slide for adjustment of arm length without turning in the supporting section 42A. The inner section 42A is welded to a fitting 46A having hinge lugs 47A, 48A for pivotal attachment of the arm structure to the lift slide, as through the agency of the pivot pin 44A. The arms, together with the nut and slide are actuable by rotation of the screw shaft 30A, which rotation is effected by the motor 35A through suitable reduction gearing such as that illustrated in Fig. 4 and contained in the housing 36A. The right-hand screw shaft 130A is similarly mounted in the right-hand column structure but is drivable from its lower end, the lower ends of both shafts 30A, 130A projecting below the floor level and into gear casings 63, 163. Fast upon the lower end of each of the shafts 30A, 130A, within the respective gear casings 63, 163, is a miter gear as 64, 164, meshing with a cooperating miter gear 65, 165, the last-mentioned gears being fast upon the opposite extremities of a cross-connecting shaft 34A. The shaft 130A is thereby driven synchronously with the shaft 30A. Since the lead of the threads of the two shafts is identical and the gearing provides an equal drive ratio, the opposed lift slides and load-supporting arms carried thereby are raised and lowered in unison.

By virtue of the telescopic arrangement of the outer or extension sections as 42A' of the load supporting arms, the arm assemblies may be shortened to permit them to be easily swung outwardly beneath a vehicle under all conditions and even though the vehicle to be lifted is of very short wheel base, and the sliding sections may be pulled out beneath the vehicle to extend them to engage a desired part of the vehicle. In this embodiment the load supporting pads as 50A are indicated as rigidly attached, as by welding, to the extension arm sections as 42A'. The slidable connection between the arm sections permits full adjustment of pad positioning without requiring an adjustable connection between the pads and the supporting arm structures.

Figures 6, 7, 8:
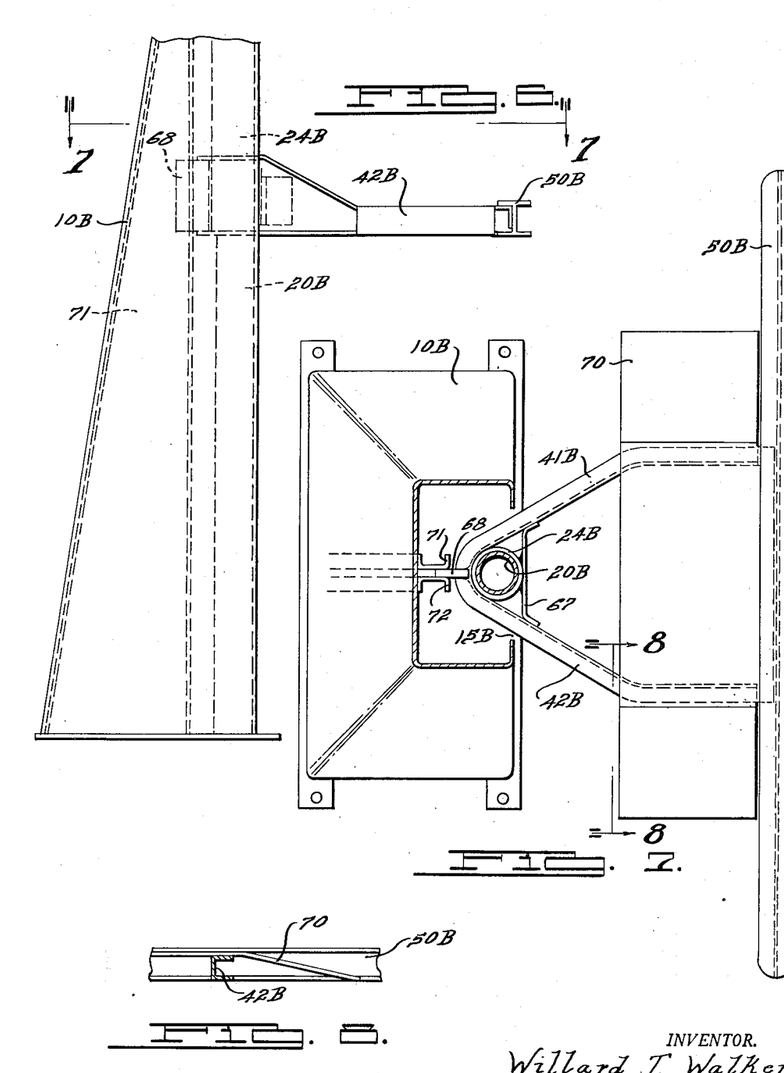
Fig. 6 is a fragmentary rear elevational view of one of the supporting structures of another modified construction.
Fig. 7 is a sectional plan view taken substantially on line 7—7 of Fig. 6 and looking in the direction of the arrows.
Fig. 8 is a sectional detail taken substantially on the line 8—8 of Fig. 7 and looking in the direction of the arrows.

In the modified construction shown in Figs. 6, 7 and 8, wherein like reference characters to those already employed are utilized, distinguished by the addition of the letter B to each, the supporting column structure may correspond to that of the first-described embodiment and will need no detailed redescription. The load-supporting arms 41B, 42B, are rigidly attached to the lift slide 24B, however, and project angularly outwardly therefrom. The lift slide is of cylindrical form and slidably surrounds the cylindrical post 20B. The arms 41B, 42B, may be integral with one another, formed of a continuous length of metal wrapped about and welded to the slide 24B, a reinforcing gusset plate as 67 being provided, connecting the arms and the slide member 24B upon the opposite or inner sides of the latter and welded to both. To prevent rotation of the slide and arms about the axis of the post, a guide fin or key member 68 projects rigidly outwardly from the slide within the column 10B and extends slidably between and is guided by a slideway defined by a pair of spaced channel members 71, 72, rigidly mounted within the column. The channel members 71, 72, may taper conformably to the slope of the outer wall of the column, so that their outer flanges may be rigidly attached as by welding to such outer wall, while their inner flanges are vertical, providing a vertical guide for the key member 68.

At their extremities the arms 41B, 42B carry a longitudinal rail 50B welded or otherwise rigidly attached and which may comprise an I-beam section of sufficient length to extend between and lie beneath the front and rear axle or equivalent portions of the longest vehicles to be accommodated on the lift. In this embodiment the portions of the arms 41B, 42B, which lie relatively close to the longitudinal rails 50B are perpendicular to such rails, the rails being closer together than the wheels of vehicles to be supported on the lift so as to underlie the axles or equivalent parts as indicated. In order to position the vehicle it must be driven so that its front wheels pass over the arms 41B, 42B, and sheet metal ramp means may be provided to facilitate driving the vehicle into place. The ramp structure, generally designated 70, horizontally bridges the arms and extends angularly downwardly, forwardly of arm 41B and rearwardly of arm 42B, to lie close to or against the floor, when the arms are in the lowered position.

Figures 9, 10:
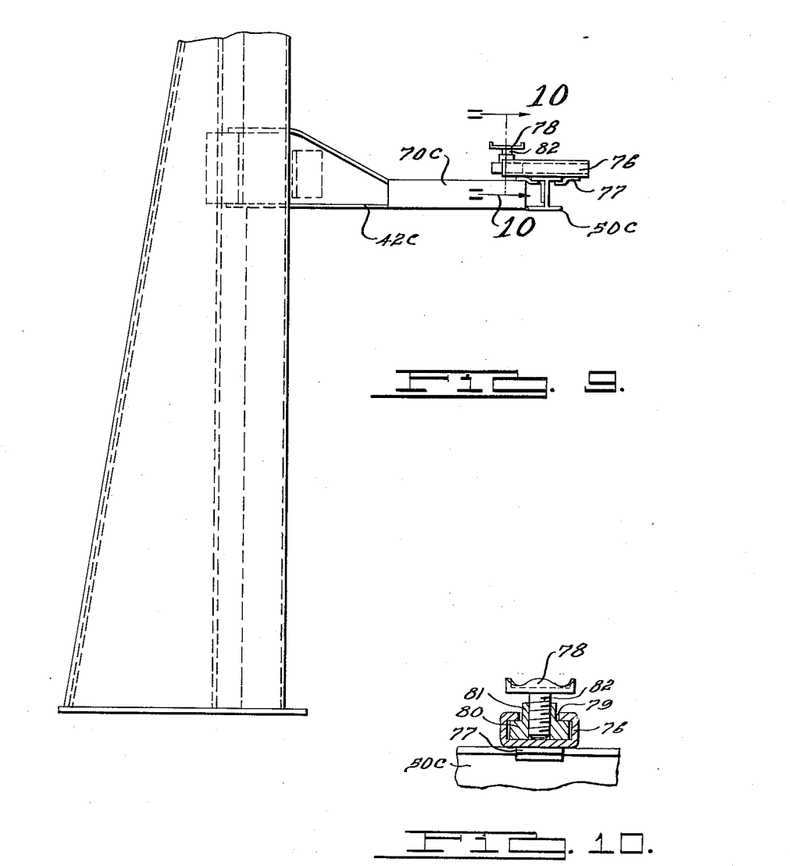
Fig. 9 is a fragmentary rear elevational view of one of the supporting structures of another modified construction.
Fig. 10 is a sectional detail taken substantially on the line 10—10 of Fig. 9 and looking in the direction of the arrows.

In a further modification depicted in Figs. 9 and 10, in connection with which the letter C is added to corresponding reference numerals for parts analogous to those already described, longitudinal load-supporting rails as 50C are similarly supported by and actuable with the rigid load-supporting arms 41C, 42C, and the other supporting and actuating mechanisms may correspond in construction and arrangement to the embodiment last described. Additional or supplemental load-carrying means are attached to the longitudinal rails 50C, however, permitting the vehicle to be supported from its frame rather than from the axles. The supplemental supporting means comprises four relatively short cross rails 76, one carried by each end of each of the longitudinal rails. The cross rails are of box section and provided with bracket portions 77 attached to their bottoms and slidably underhanging the top flange of the longitudinal rail as 50C by which they are carried. Each cross rail member may accordingly be moved longitudinally along its main rail 50C. The top web of each box section cross rail is longitudinally slotted as indicated at 79, and a load-supporting pad 78 carried by the cross rail is adapted to underengage the frame or other suitable portion of the vehicle spaced farther from its center line than the axle portion. A slide block 80 is confined but movable in the cross rail and carries the pad 78, which may thereby be moved transversely to accommodate its positioning to car frame portions or other parts of varying width to which the lift is to be accommodated. The slide block 80 is provided with a tapped boss 81, and pad 78 is carried by a correspondingly threaded stem 82, engaging the threads of the boss and permitting the pad to be raised and lowered to fit car portions arranged at varying elevations.

It will be apparent that the lift structure of the present embodiment may be similar to that of the embodiment of Figures 6, 7 and 8 except for the provision of the cross rails and supplemental supporting means carried thereby. The main rails 50C may also be spaced somewhat farther apart than rails 50B if axle engagement is not desired.

Figures 11, 13:
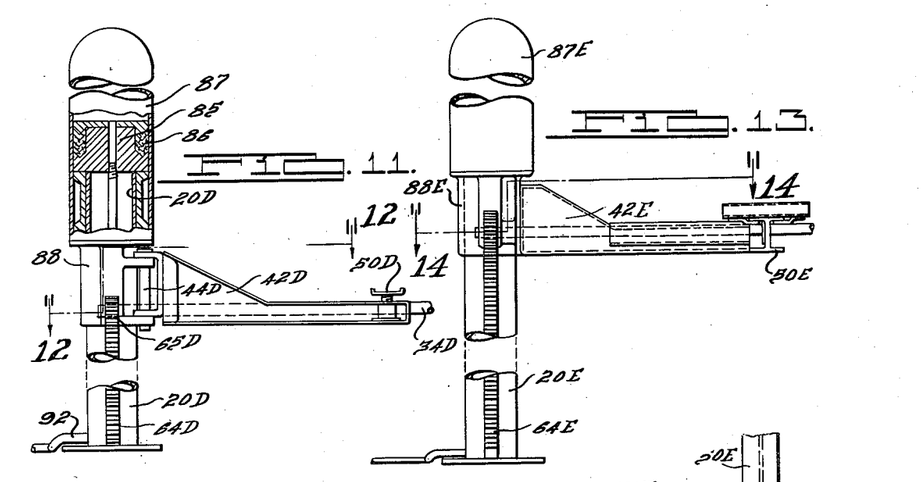
Fig. 11 is a view partly in transverse vertical section and partly in rear elevation, with parts broken away, showing one of the supporting structures of another modified construction.
Fig. 13 is a view similar to Fig. 11 showing another modified construction.
Figure 12:
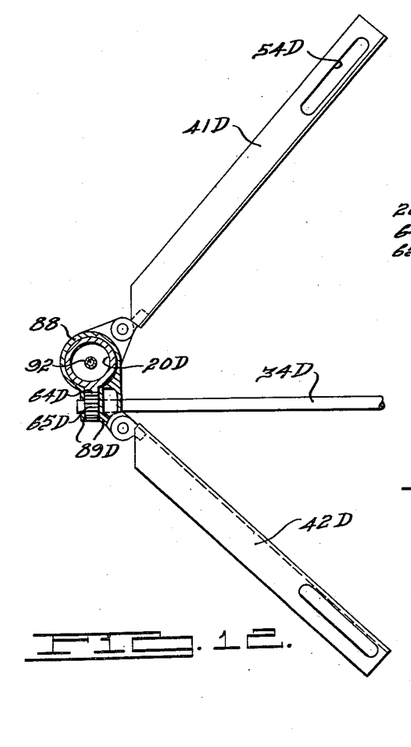
Fig. 12 is a plan view taken substantially on the line 12—12 of Fig. 11 and looking in the direction of the arrows.

In the modified construction shown in Figs. 11 and 12, the box section column portion is omitted and a simple cylindrical post 20D formed of hollow steel or the like provided upon either side of the vehicle in equivalent positioning, suitably anchored to the floor at their lower extremities and each carrying at its top a piston portion 85 rigidly attached thereto and provided with suitable packing means as 86 providing a tight seal between the piston and a surrounding vertically slidable hollow cylinder 87. Cylinder 87 is closed at its top and slidable up and down over the fixed piston and its supporting post 20D. Hydraulic feed means, such as the conduit generally designated 92 may be provided to conduct fluid under pressure from a suitable source and control means (not shown) to the lower end of the post 20D. Such feed may be below the floor level, and the conduit means may be extended upwardly through the post and through the fixed piston 85, to communication with the interior of the vertically slidable cylinder 87. It will be apparent that by delivering fluid under pressure through such a supply means to the interior of the cylinder the latter may be raised, while by withdrawing the fluid therefrom it may be permitted to descend. A cylindrical guide fitting 88 rigidly secured to the lower end of the cylinder 87 slidably encircles the post 20D, furnishing a bearing spaced from the area of engagement of the cylinder and piston and providing a support for the load-carrying arms 41D, 42D, attached thereto as by means of pivot pins 44D in a manner analogous to the mode of attachment of the supporting arms 41, 42, of the embodiment first described and functioning similarly to provide means whereby the supporting arms may be swung out of the way during movement of a vehicle into and from the space between the post, but may be swung under the vehicle and engaged with the frame or other suitable rigid portions to permit the same to be lifted. Corresponding pad means as 50D may be provided for engagement with the vehicle.

A rack 64D extends vertically of the post 20D, being indicated as rigidly attached to its rear face. The rack extends the full length of the travel of the load-carrying slide portion 88, and a synchronizing pinion 65D journaled in portion 88 meshes with the rack and is rigidly connected to a corresponding synchronizing pinion (not shown) similarly carried by the right-hand assembly. The two pinions are fast upon opposite extremities of the synchronizing cross shaft 34D and insure parallel movement of the lifting frames and hydraulic cylinders at opposite sides of the lift. Lifting effort is supplied to the similarly disposed and constructed hydraulic lift structure constituting the right side of the assembly, and it will be appreciated that no detailed description of these parts will be required. Pinion 65D is confined between a pair of flanges 89D carried by the fitting 88 and the rack 64D projects somewhat into the space between such flanges, serving as a key to prevent rotation of the cylinder.

Figure 14:
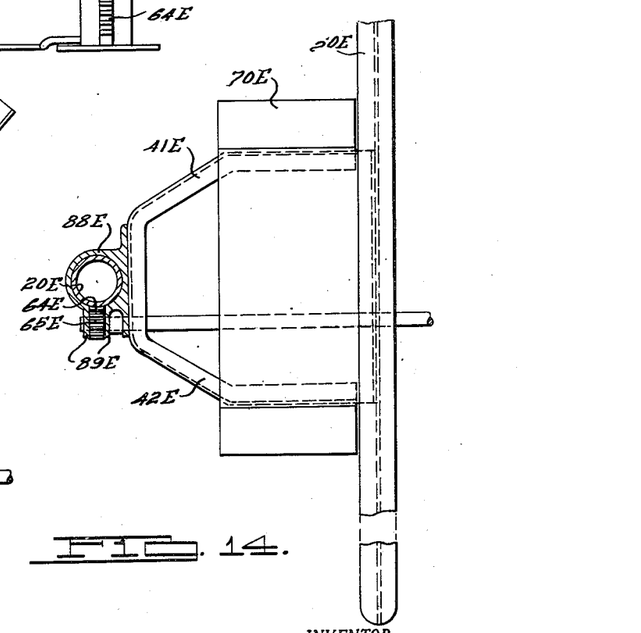
Fig. 14 is a sectional plan view taken substantially on the line 14—14 of Fig. 13 and looking in the direction of the arrows.

In the modification depicted in Figs. 13 and 14, the hydraulic actuating mechanism corresponds to that of the embodiment last described. Load-supporting arms 41E, 42E, are rigidly connected to the supporting slide member 88E, constituting the bottom fitting for the telescoping cylinder 87E. Arms 41E, 42E correspond in their general arrangement to the arms 41B, 42B, of the third described embodiment, and rigidly support longitudinally disposed axle-engaging rail means 50E. The supporting flange means 89E between which the synchronizing pinion 65E is confined and in which the synchronizing shaft 34E is journaled lie close to the opposite sides of the rack 64E and the rack forms a key preventing rotation of the supported lift mechanism upon the post 20E.

Figures 15, 16:
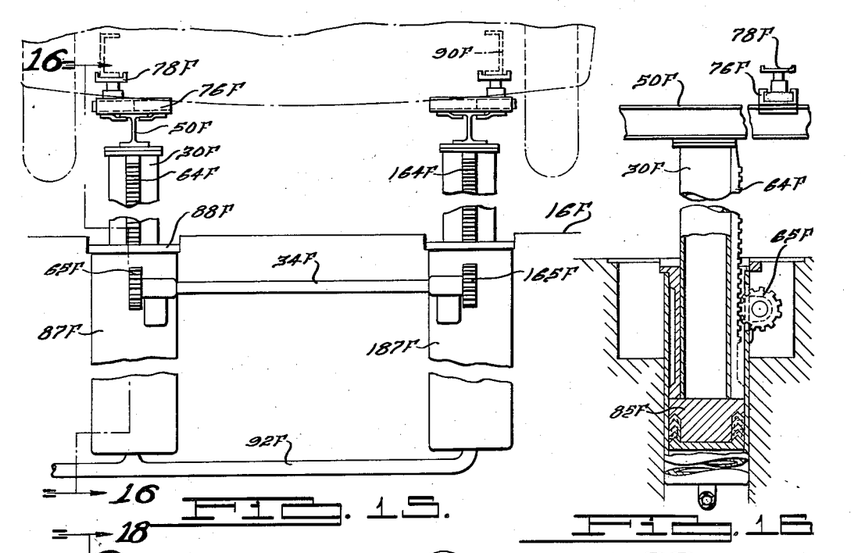
Fig. 15 is a rear elevational view, partly broken away, of another modified construction, diagrammatically indicating the positioning of a car held thereby in elevated position.
Fig. 16 is a view, partly in side elevation and partly in vertical section, taken substantially on the line 16—16 of Fig. 15 and looking in the direction of the arrows.

In the further modification depicted in Figs. 15 and 16, a pair of stationary vertical cylinders as 87F, 187F, are provided below the floor level, laterally spaced with respect to the lift area and so positioned that a line drawn between them would lie approximately beneath the center of gravity of a vehicle properly positioned in such area. The lateral spacing of the cylinders substantially corresponds to the spacing of the side rails of the frame structure of vehicles of the class for which the lift is primarily designed. For example, the spacing may correspond to the ordinary frame width of passenger vehicles. The cylinders are vertical, and open at their upper ends substantially at the floor level. A piston member as 85F slides in the cylinder and carries the plunger 30F. Each plunger carries at its top a longitudinal rail as 50F, and if desired, it will be appreciated that the spacing of the cylinder and plunger assemblies and of the rails carried thereby might be such as to adapt the rails to lie beneath the axles or equivalent portions of the vehicle to be lifted, in the manner indicated above. In order to provide greater room for working between the plungers, and more ready access to the underside of the vehicle, however, the cylinders and plungers preferably are spaced somewhat wider, as best indicated at Fig. 15, and the rails carry at either end adjustable pads as 78F carried by cross rails 76F longitudinally slidable along the main rails 50F and arranged to permit lateral sliding movement for adjustment of the load-sustaining pads 78F, the construction of these parts corresponding to the equivalent elements of the embodiments of Figs. 9 and 10, and the pads being adapted to underengage the frame members as 99F.

In order to insure synchronous movement of the left-hand and right-hand plunger assemblies, a cross-connecting shaft 34F is provided having pinions 65F, 165F, secured to its opposite ends and meshing with racks 64F, 164F, in a fashion analogous to the arrangement of the equivalent parts of the embodiment last described. The racks 64F, 164F, may also serve as keying means to prevent rotation of the plunger and the vehicle-supporting means carried thereby, the racks projecting from the plungers and riding slidably in slot means (undesignated) formed in the cylinder heads of the respective cylinders, one such head means being designated 88F. Hydraulic fluid supply means is diagrammatically indicated at 92F, and it will be appreciated that the details of construction of the hydraulic system form no part of my present invention and need not be considered.

Figure 17:
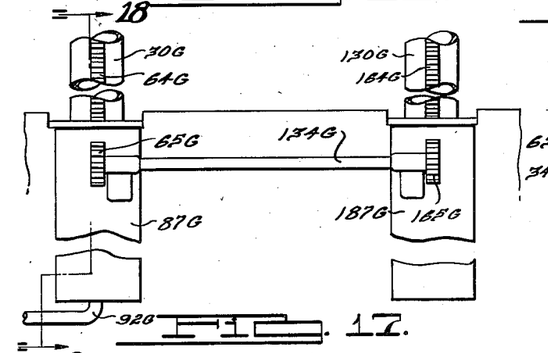
Fig. 17 is a view similar to Fig. 15, partly broken away, showing still another modified construction.
Figure 18:
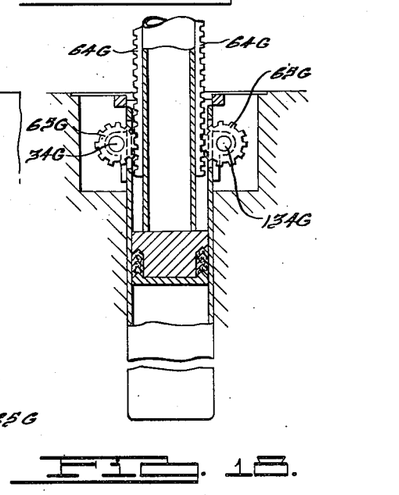
Fig. 18 is a view partly in vertical section and partly in side elevation, also broken away, taken substantially on the line 18—18 of Fig. 17 and looking in the direction of the arrows.
Figure 19:
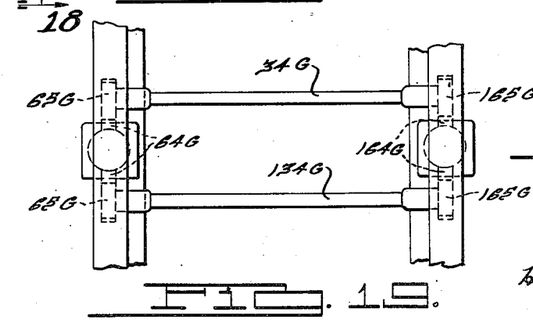
Fig. 19 is a fragmentary plan view.

In the further modification disclosed in Figs.

17, 18, and 19, laterally spaced pipe-type cylinders as 87G, 187G, are provided, arranged vertically below the floor level and open substantially at the floor line. Only the cylinder 87G serves as a hydraulic cylinder, however, the pipe 187G serving simply as a casing. Hydraulic fluid is delivered to the lower extremity of the cylinder 87G, as through the piping 92G, and the left-hand plunger 30G may thereby be raised and lowered by direct hydraulic action in the conventional manner. The corresponding right-hand plunger 130G, however, is not directly hydraulically actuated but is mechanically driven by a pair of combined driving and synchronizing shafts as 34G, 134G, the former extending transversely in front of the cylinder and plunger assemblies, and the latter similarly positioned transversely of the rear of the assemblies, each such shaft being provided with pinion means fast upon each end and designated 65G, 165G, the pinions meshing with vertically disposed racks as 64G, 164G, and one such rack being carried vertically upon the front of each plunger and another upon the rear, so that a balanced drive is provided, eliminating any tendency to rock either of the plungers toward the front or rear about a transverse axis. It will be appreciated that this also minimizes friction upon the driving, guiding and bearing means for the plungers and upon the piston 85G carried by plunger 30G.

While it will be apparent that the preferred embodiments of my invention herein disclosed are well calculated to attain the objects first above stated, it will be apparent that the invention is susceptible to variation, modification, and change within the spirit and scope of the subjoined claims.

I claim:

1. The method for raising vehicles having front and rear wheels and a main frame including a pair of spaced side members longitudinally extending over at least a portion of the distance between said front and rear wheels; which comprises engaging one of said side members over the major portion of the length thereof between said front and rear wheels, applying an upwardly directed force at substantially the center of said engagement, separately engaging the other of said side members in the same manner as said first side member, and applying an upwardly directed force on said other side member concurrently with said first upwardly directed force.

2. The method for raising vehicles having front and rear wheels and a main frame including a pair of spaced side members longitudinally extending over at least a portion of the distance between said front and rear wheels; which comprises engaging one of the said side members over a portion of the length thereof between said front and rear wheels, applying an upwardly directed single force on said one side member within the longitudinal confines of said portion of the length thereof, separately engaging the other of said side members in the same manner as said first side member, and applying an upwardly directed single force on said other side member concurrently with said first upwardly directed single force.

3. For elevating a vehicle having a main frame with front and rear wheels thereon, a vehicle hoist including a pair of transversely spaced lift members located in approximate alignment with the center of gravity of the vehicle when the vehicle is in a position to be elevated, a pair of frame supporting arms corresponding to each of said lift members, and means mounting each pair of said arms adjacent one of their ends on a corresponding lift member for horizontal swinging movement to first positions extended longitudinally of the hoist and to second positions extended transversely of the hoist, with said arms being of a length to provide for their swinging movement beneath said frame and between said front and rear wheels when the vehicle is in said position to be elevated, whereby to locate the free ends of said arms below longitudinally spaced portions of said frame located at opposite sides of said center of gravity so that the vehicle frame will be contacted and raised when the arms are elevated by the lift members.

4. For elevating a vehicle having a main frame with front and rear wheels thereon, a vehicle hoist including a pair of transversely spaced lift members, a pair of swingable frame supporting members pivoted on each of said lift members for pivotal movement in horizontal planes, with said swingable members being pivoted at one of their ends for movement of the opposite ends thereof between said front and rear wheels, when a vehicle is in a position to be lifted, whereby to locate said opposite ends beneath longitudinally spaced portions of said frame at opposite sides of said lift members so that the vehicle frame will be contacted and raised when the arms are elevated by the lift members.

5. For elevating a vehicle having a main frame with front and rear wheels thereon, a vehicle hoist including a pair of transversely spaced lift members, a pair of pivoted frame supporting arms corresponding to said lift members, means mounting each pair of said arms at one of their ends on a corresponding lift member for pivotal movement in horizontal planes to first positions extended longitudinally of the hoist and to second relatively diverged positions extended inwardly of the hoist, said arms, in the use of the lift, being moved to said first positions when a vehicle is to be located between said lift members, and to said second positions, when a vehicle is in a position to be elevated, said arms being of a length so that in said second positions the free ends thereof are located between said front and rear wheels beneath longitudinally spaced portions of said frame at opposite sides of the center of gravity of the vehicle being elevated, and frame engaging members movably mounted adjacent the free ends of said arms for adjustable movement longitudinally of said arms whereby the vehicle frame will be contacted and raised when the arms are elevated by the lift members.

WILLARD T. WALKER.

REFERENCES CITED

The following references are of record in the file of this patent:

UNITED STATES PATENTS

| Number | Name | Date |
|---|---|---|
| 1,259,942 | Weaver | Mar. 19, 1918 |
| 2,069,236 | Fitch | Feb. 2, 1937 |
| 2,124,726 | Blum | July 26, 1938 |
| 2,160,543 | Gormley et al. | May 30, 1939 |
| 2,233,009 | Hinds | Feb. 25, 1941 |
| 2,423,954 | Thompson | July 15, 1947 |
| 2,479,089 | Voskamp | Aug. 16, 1949 |

FOREIGN PATENTS

| Number | Country | Date |
|---|---|---|
| 319,918 | Great Britain | Oct. 3, 1929 |
| 501,217 | Great Britain | Feb. 13, 1939 |
| 731,005 | France | May 24, 1932 |